United States Patent
Huang

(10) Patent No.: US 7,746,201 B2
(45) Date of Patent: Jun. 29, 2010

(54) PORTABLE ELECTRONIC DEVICE WITH HALL SENSOR

(75) Inventor: Po-Hua Huang, Tu-Cheng (TW)

(73) Assignee: Chi Mei Communications Systems, Inc., Tu-Cheng, Taipei County (TW)

( * ) Notice: Subject to any disclaimer, the term of this patent is extended or adjusted under 35 U.S.C. 154(b) by 157 days.

(21) Appl. No.: 11/964,800

(22) Filed: Dec. 27, 2007

(65) Prior Publication Data
US 2009/0058578 A1 Mar. 5, 2009

(30) Foreign Application Priority Data
Aug. 29, 2007 (CN) .................. 2007 1 0201517

(51) Int. Cl.
*H01H 9/00* (2006.01)
*H04M 1/00* (2006.01)
*H04M 3/00* (2006.01)
(52) U.S. Cl. ............... 335/205; 455/575.3; 379/433.13
(58) Field of Classification Search ......... 335/205–207; 455/575.3; 379/433.13
See application file for complete search history.

(56) References Cited

U.S. PATENT DOCUMENTS

| | | | |
|---|---|---|---|
| 6,314,183 B1 * | 11/2001 | Pehrsson et al. ....... | 379/433.06 |
| 6,630,878 B2 * | 10/2003 | Pan et al. ................ | 335/285 |
| 6,734,667 B2 * | 5/2004 | Lorenzen ................. | 324/207.2 |
| 6,876,872 B2 * | 4/2005 | Ko ............................ | 455/572 |
| 7,016,492 B2 * | 3/2006 | Pan et al. ................ | 379/433.13 |
| 7,136,688 B2 * | 11/2006 | Jung et al. ............... | 455/575.4 |
| 7,242,974 B2 * | 7/2007 | Ko ............................ | 455/575.3 |
| 7,289,833 B2 * | 10/2007 | Kim et al. ............... | 455/575.3 |
| 7,489,920 B2 * | 2/2009 | Kim ........................ | 455/411 |
| 2002/0114448 A1 * | 8/2002 | Kim et al. .............. | 379/433.13 |
| 2003/0179880 A1 * | 9/2003 | Pan et al. ............... | 379/433.13 |
| 2004/0214612 A1 * | 10/2004 | Park et al. .............. | 455/566 |
| 2005/0227635 A1 * | 10/2005 | Hawkins et al. ......... | 455/90.3 |
| 2006/0046792 A1 * | 3/2006 | Hassemer et al. ....... | 455/575.1 |

* cited by examiner

*Primary Examiner*—Lincoln Donovan
*Assistant Examiner*—Alexander Talpalatskiy
(74) *Attorney, Agent, or Firm*—Jeffrey T. Knapp

(57) ABSTRACT

A portable electronic device includes a cover section (54), a body section (52), a magnet (60) and a hall sensor (70). The cover section has a printed circuit board secured therein. The body section has a connecting portion, and the body section is rotatably connected to the cover section with the connecting portion. The magnet is secured in the connecting portion, and the hall sensor is electrically attached to the printed circuit board. The magnet acts on the hall sensor according to relative rotation between the cover section and the body section, thereby switching the portable electronic device to a work mode when the cover section is opened away from the body section or a power save mode when the cover section is closed to the body section.

6 Claims, 7 Drawing Sheets

PORTABLE ELECTRONIC DEVICE WITH HALL SENSOR

BACKGROUND OF THE INVENTION

1. Field of the Invention

The present invention relates to portable electronic devices, particularly to a portable electronic device with a hall sensor which is responsive to magnetic fields.

2. Discussion of the Related Art

With the development of wireless communication and information processing technologies, foldable electronic devices such as mobile phones and PDAs (Personal Digital Assistants) are now in widespread use, and consumers may now enjoy the full convenience of high technology products anytime and anywhere. Foldable electronic devices are particularly favored by a wide range of consumers because of their small size, novel design and ease of use.

The foldable electronic device such as mobile phone generally includes a cover section and a body section. The cover section and the body section are rotatably interconnected through a hinge assembly, thus allowing the mobile phone to be switched between an in-use position and a closed position. When the cover section is opened relative to the body section, the mobile phone is automatically switched to a work mode. Accordingly, the keypads may be operated so as to input information by user. The background lights and the liquid crystal display in the mobile phone are actuated. However, when the cover section is not fully closed relative to the body section, the liquid crystal display and the background light will be shut off.

The above function of the foldable electronic device is provided by a device controlling a main circuit to be conducted or be shut off. The device usually includes a hall sensor and a magnet. The hall sensor is a transducer, which varies output voltages in response to changes in magnetic field. Due to a change of the position relationship between the hall sensor and the magnet, the hall sensor is affected by magnetic fields of the magnet so as to activate or shut off the main circuit. Referring to FIGS. 6 and 7, a mobile phone 10 is provided. The mobile phone 10 includes a body section 12, a cover section 14 and a hinge assembly 16. The hinge assembly 16 is rotatably connected to the body section 12 and the cover section 14. The body section 12 has a printed circuit board 120 positioned therein. The printed circuit board 120 has a main circuit, and the main circuit is electronically connected to a hall sensor 122. The cover section 14 disposes a magnet 142 therein corresponding to the hall sensor 122. The magnet 142 includes an S pole 1424 and an N pole 1422. When the cover section 14 is closed relative to the body section 12, the S pole 1424 of the magnet 142 is opposite to the hall sensor 122.

When the user opens the mobile phone 10, the cover section 14 with the magnet 142 is far from the body section 12. Accordingly, the hall sensor 122 is far from the S pole 1424 of the magnet 142, and is toward the N pole 1422. The hall sensor 122 then activates the main circuit of the printed circuit board 120 so that the mobile phone 10 is switched to a work mode. The user may operate the mobile phone 10. If the cover section 14 is closed to some angles relative to the body section 12, the hall sensor 122 is turned to toward the S pole 1424 of the magnet 142. The hall sensor 122 will switch the main circuit to be shut off, and allow the mobile phone 10 to be in a power saver mode. Although the above device may realize the control for the work mode of the mobile phone, the magnet 142 will occupy a space along a thickness direction in the cover section 14. The cover section 14 requires a thin thickness, however, this structure increases the thickness of the cover section 14, and will not satisfy a development tendency of miniaturization for mobile phones.

Therefore, an improved portable electronic device for activating or shutting off the call mode is desired in order to overcome the above-described shortcoming.

SUMMARY OF THE INVENTION

One embodiment of the present portable electronic device includes a cover section, a body section, a magnet and a hall sensor. The cover section has a printed circuit board secured therein. The body section has a connecting portion, and the body section is rotatably connected to the cover section with the connecting portion. The magnet is secured in the connecting portion, and the hall sensor is electrically attached to the printed circuit board. The magnet acts on the hall sensor according to relative rotation between the cover section and the body section, thereby switching the portable electronic device to a work mode when the cover section is opened away from the body section or a power save mode when the cover section is closed to the body section.

Other advantages and novel features of the present portable electronic device will become more apparent from the following detailed description thereof when taken in conjunction with the accompanying drawings.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views, in which.

DETAILED DESCRIPTION OF THE INVENTION

The following description sets forth an exemplary embodiment in which the present invention may be used. Specifically, certain reference is made below to a cellular telephone. It should be understood, however, that present invention may be used in a wide variety of applications and devices and is not limited to the exemplary embodiment described below. For example, the invention may be used in any device or apparatus, which uses a magnet in conjunction with a movable portion such as a movable cover or door including cellular and non-cellular telephones, notebook or laptop computers and refrigerators.

Figure 1:
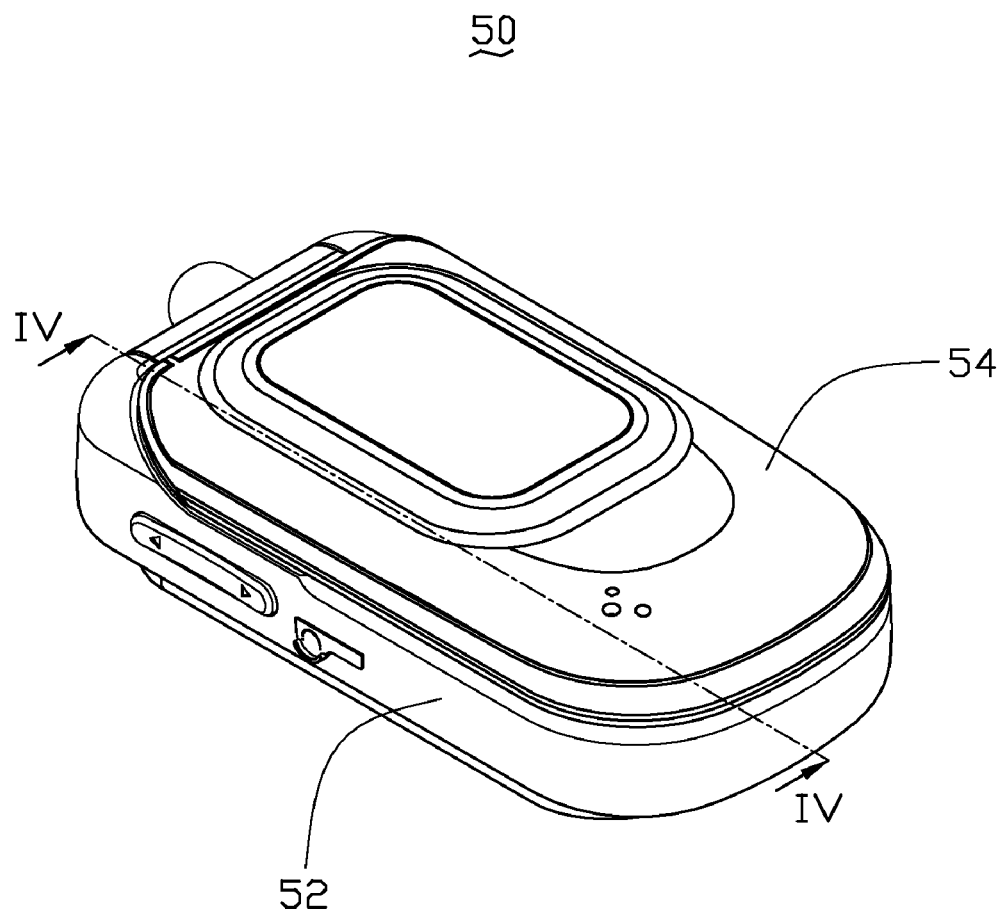
FIG. 1 is an isometric view of a mobile phone of an embodiment.
Figure 2:
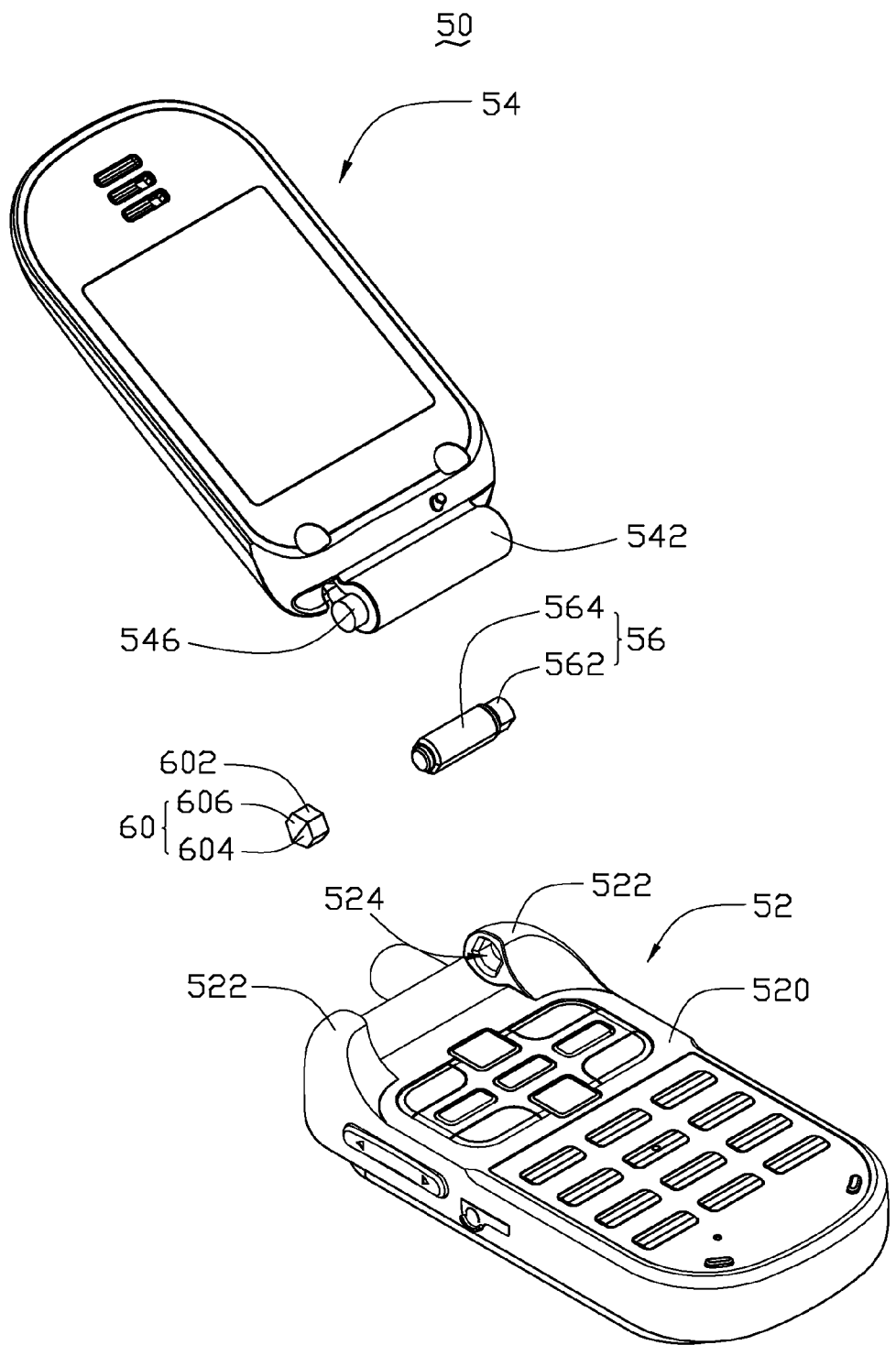
FIG. 2 is an exploded, isometric view of the embodiment of the mobile phone shown in FIG. 1.
Figure 3:
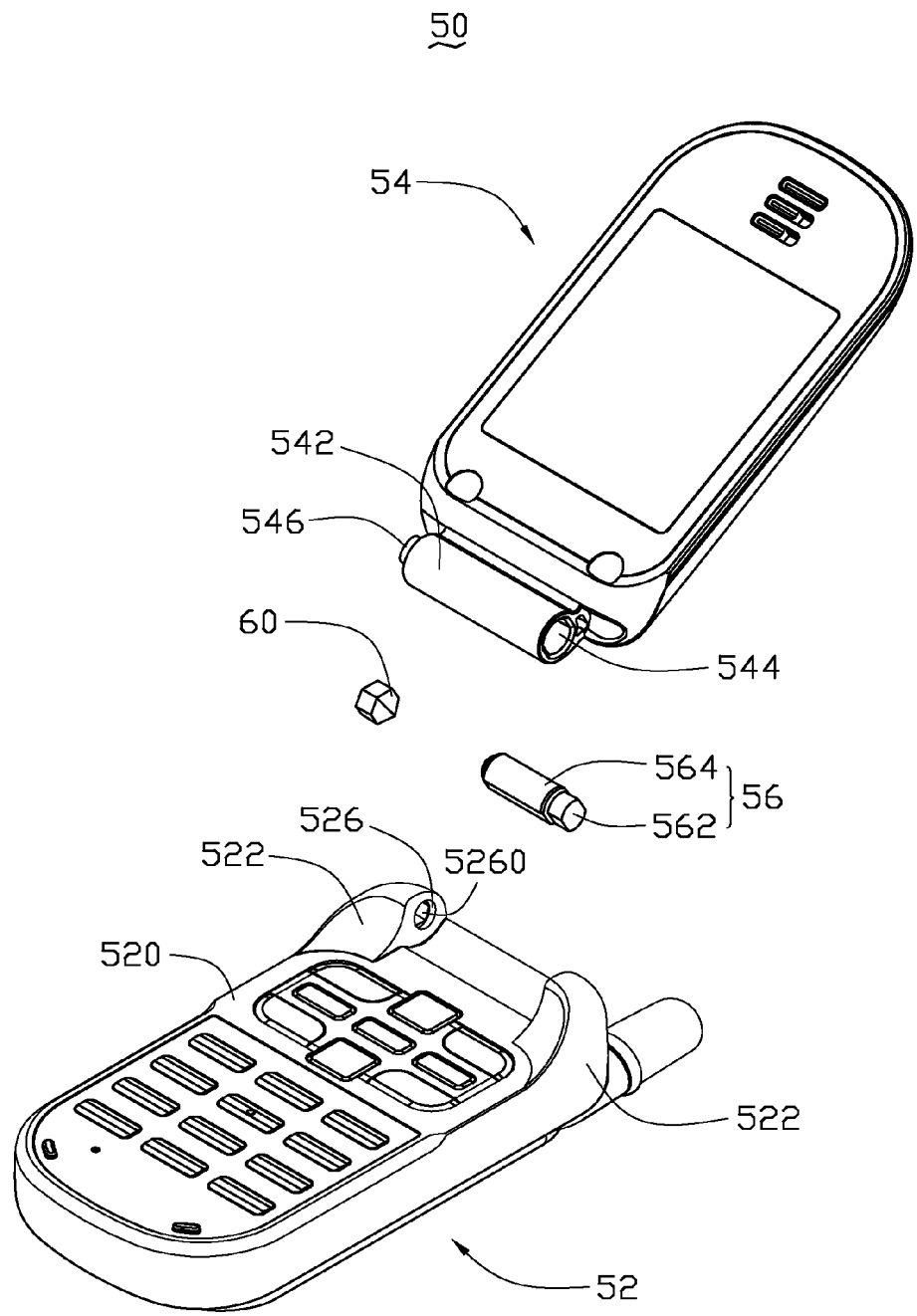
FIG. 3 is similar to FIG. 2, but view from another aspect.

Referring now to FIGS. 1 to 3, a portable electronic device such as a mobile phone 50, in one illustrated embodiment, includes a body section 52, a cover section 54, a hinge assembly 56, a magnet 60 and a hall sensor 70. The hinge assembly 56 is rotatably connected to the body section 52 and the cover section 54.

The body section 52 includes a first surface 520. The body section 52 has two connecting portions 522 at one end of the first surface 520. The two connecting portions 522 are disposed opposite to each other. One of the connecting portions 522 define a deformed hole 524, the other of the connecting portions 522 define a receiving hole 526 and a six polygonal hole 5260. The deformed hole 524 is substantially a polygonal blind hole. The receiving hole 526 is circular, and is in communication with the six polygonal hole 5260.

Figure 4:
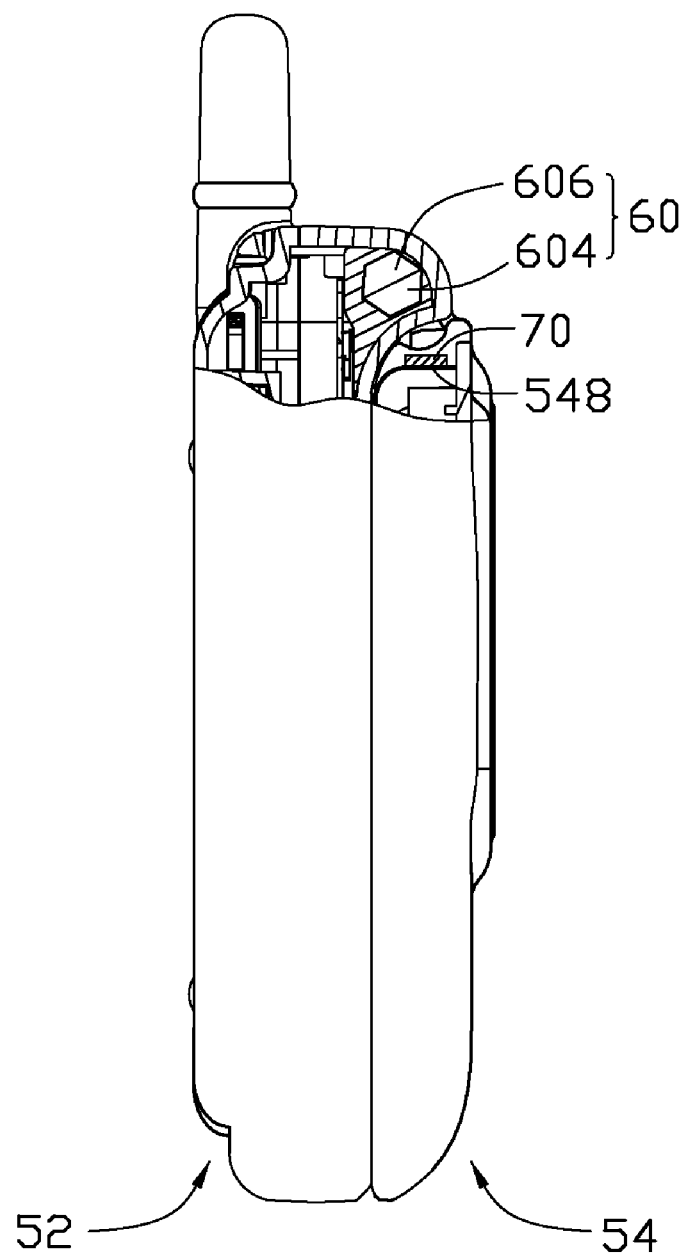
FIG. 4 is a partially cross-section view of FIG. 1 along line IV-IV.

Referring to FIG. 4, the cover section 54 has a knuckle 542 formed at one end thereof. The knuckle 542 defines a cavity 544 at one side thereof, and has a shaft portion 546 formed at an opposite side of the cavity 544. The shaft portion 546 may be received in the receiving hole 526, and may rotate in the receiving hole 526 relative to the connecting portion 522. The cover section 54 disposes a printed circuit board 548 therein. The printed circuit board 548 is a flex printed circuit board 548, and is electronically connected to a main circuit of the mobile phone 50.

The hinge assembly 56 includes a main shaft 562 and a sleeve 564. The main shaft 562 is received in the sleeve 564. The configuration of one end portion of the main shaft 562 is the same as that of the deformed hole 524 so that the main shaft 562 is non-rotatably received in the deformed hole 524. The configuration of the sleeve 564 is the same as that of the cavity 544 so that the sleeve 564 is non-rotatably engaged in the cavity 544 of the cover section 54.

Figure 5:
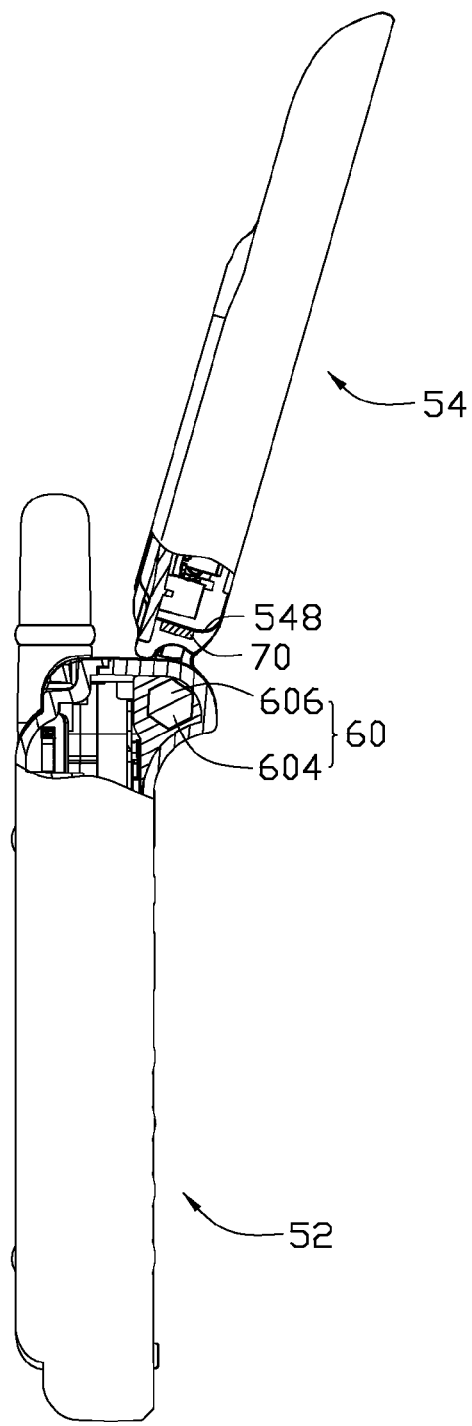
FIG. 5 is similar to FIG. 4, but show when the mobile phone is opened.
Figure 6:
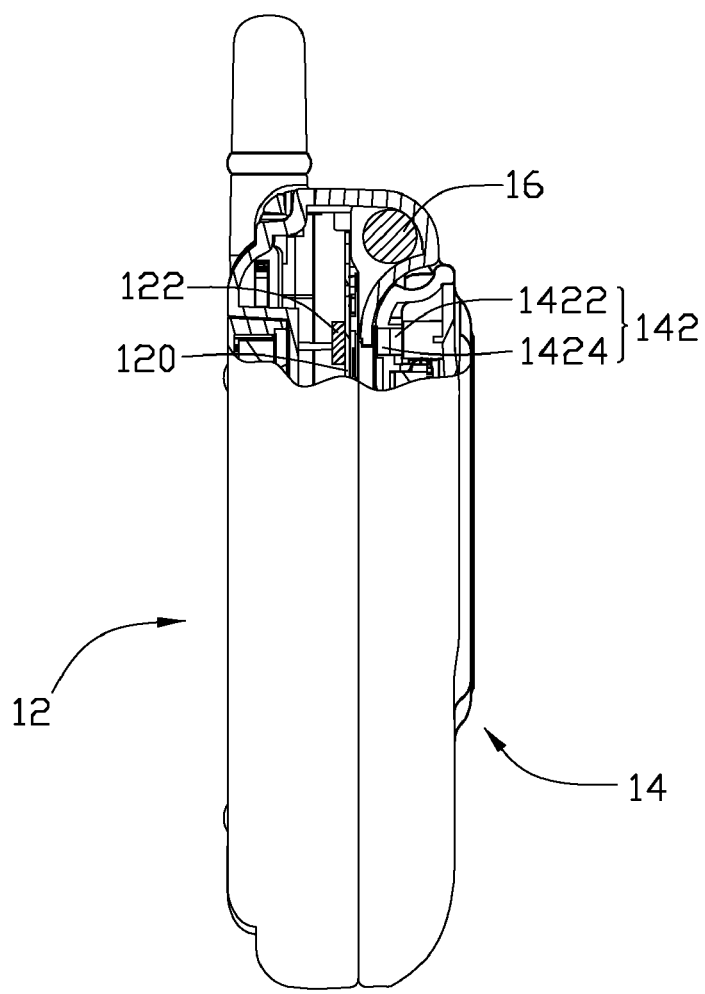
FIG. 6 is a conventional view of a mobile phone with a hall sensor and a magnet.
Figure 7:
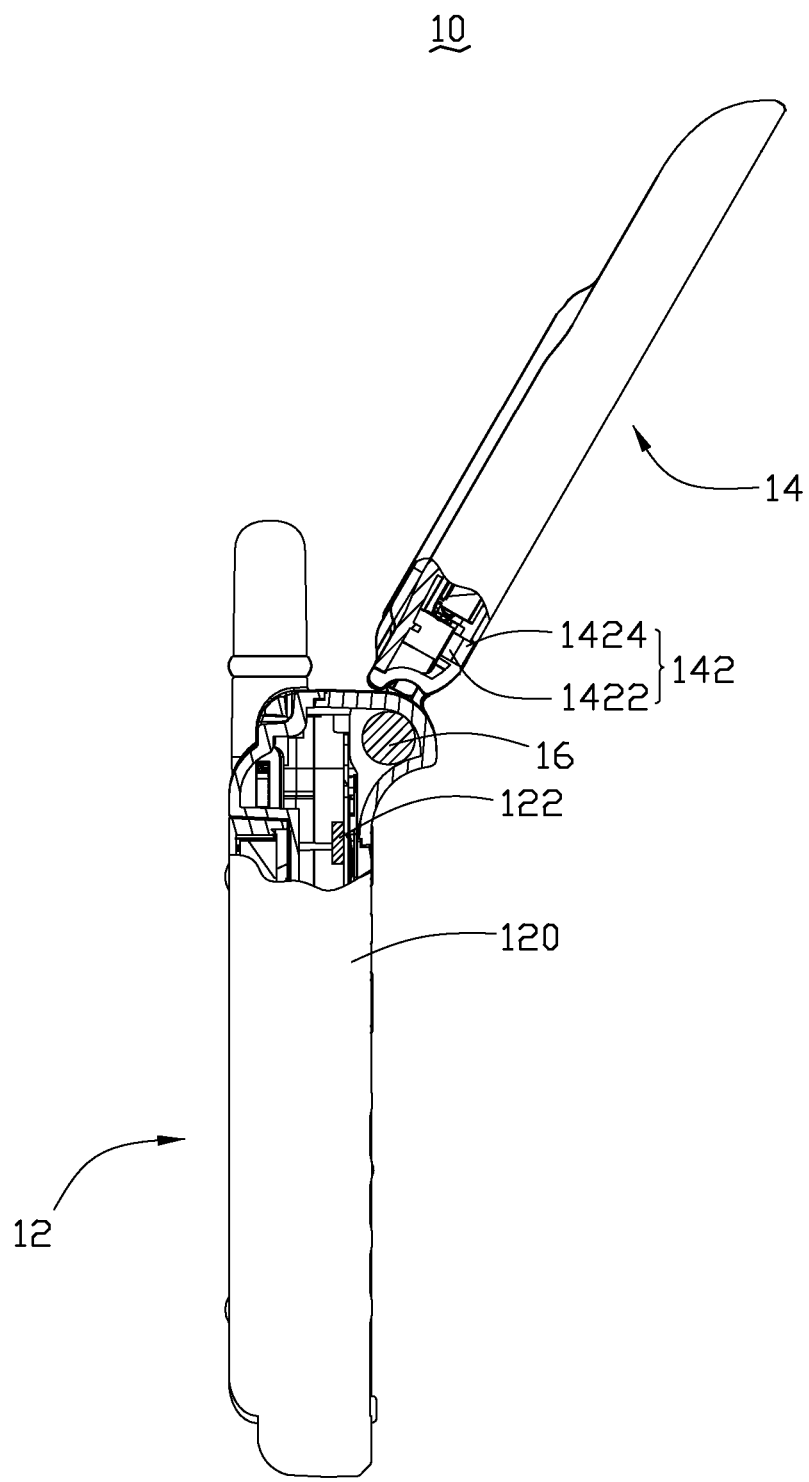
FIG. 7 is similar to FIG. 6, showing the mobile phone is opened.

Referring to FIG. 5, the magnet 60 and the hall sensor 70 are disposed in the mobile phone 50, which cooperatively control the work mode of the mobile phone 50.

The magnet 60 is substantially a cylinder, and has a six polygonal surface 602 in a peripheral wall thereof. The six polygonal surface 602 of the magnet 60 is configured for being tightly engaged in the six polygonal hole 5260 of the body section 52 so as to fix the magnet 60 in the six polygonal hole 5260. The magnet 60 includes an S pole 604 and an N pole 606. The S poly 604 and the N pole 606 are symmetrical along an outer peripheral wall thereof.

The hall sensor 70 includes a hall element, an amplifier, a Schmitt circuit and a triode. The hall sensor 70 is disposed in the printed circuit board 548 of the cover section 54. The working principle of the hall sensor 70 is: when the S pole of the magnet acts on the hall element, the hall element will produce a small voltage. The voltage will then be applied to the amplifier and the Schmitt circuit, so the triode outputs a low voltage. The low voltage causes the main circuit to be shut off, and further activates the power saver mode of the mobile phone. When the S pole of the magnet is far away from the hall element, the triode outputs a high voltage. The high voltage causes the main circuit to be activated, and further activates the work mode of the mobile phone.

When the magnet 60 and the hall sensor 70 are assembled in the mobile phone 50, the S pole 604 of the magnet 60 firstly faces with the cover section 54. Then, the magnet 60 is placed into the six polygonal hole 5260 of the body section 502, and the six polygonal surface 5260 prevents the magnet 60 to move relative to a corresponding connecting portion 522. The hall sensor 70 is electronically coupled to the printed circuit board 548. After that, the hinge assembly 56 is received in the cavity 544 of the knuckle 542 of the cover section 54, and one end of the shaft 562 is exposed from the cavity 544. Next, the shaft portion 546 is received in the receiving hole 526 so as to enclose the polygonal hole 5260. Thus, the shaft portion 546 will prevent the magnet 60 to detach from the connecting portion 522. Finally, the shaft 562 is received in the deformed hole 524, and is non-rotatably connected to the connecting portion 522. Therefore, the assembled process is finished. When the mobile phone 50 is closed, the hall sensor 70 is opposite to the S pole 604 of the magnet 60.

In use, when the mobile phone 50 is closed, the S pole 604 of the magnet 60 acts on the hall sensor 70, and the hall sensor 70 will produce a low voltage. The low voltage causes the main circuit to be shut off. The main circuit controls the function keys and other background lights to be shut off. Due to the role of the S pole 604 of the magnet, the background lights remained shut even if the cover section 54 is opened to a small angle relative to the body section 52.

When the cover section 54 of the mobile phone 50 is opened beyond a certain angle, the hall sensor 70 is not affected by the S pole 604. The hall sensor 70 outputs a high voltage so that the main circuit is conducted. Accordingly, the background lights illuminate, and the user may operate the mobile phone 50.

As described above, the present invention provides a portable electronic device such as a mobile phone. A main advantage of the portable electronic device is that the magnet is disposed in the connecting portion 522 of the body section 52 so as to realize the control for the hall sensor 70. The position of the magnet 60 may reduce an inside space in the mobile phone, and is helpful to develop a miniature device.

In an alternative embodiment, the hall sensor 70 may be disposed in the body section 52. Accordingly, the magnet 60 is disposed in the knuckle 542 of the cover section 54. When the cover section 54 is closed relative to the body section 52, the S pole of the magnet 60 is opposite to the hall sensor 70. When the cover section is opened relative to the body section, the N pole of the magnet 60 is opposite to the hall sensor. Understandably, the number of the connecting portion 522 of the body section 52 may be one.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable electronic device, comprising:
    a cover section having a printed circuit board secured therein and a knuckle, the knuckle defining a cavity at one side thereof and forming a shaft portion at an opposite side thereof;
    a body section having two connecting portions rotatably connected to the knuckle of the cover section;
    a magnet secured in one of the connecting portions, the shaft portion abutting the magnet, and
    a hall sensor electrically attached to the printed circuit board,
    wherein the magnet acts on the hall sensor according to relative rotation between the cover section and the body section, thereby switching the portable electronic device to a work mode when the cover section is opened away from the body section or a power save mode when the cover is closed to the body section.

2. The portable electronic device as claimed in claim 1, wherein the magnet includes an S pole and an N pole, and the S pole is opposite to the hall sensor when the cover section is rotated to cover the body section.

3. The portable electronic device as claimed in claim 2, wherein the S pole is located to be symmetrical to the N pole.

4. The portable electronic device as claimed in claim 1, wherein the magnet has a six polygonal wall, the connecting portion for receiving the magnet defines a six polygonal hole, and the magnet is received in the polygonal hole.

5. The portable electronic device as claimed in claim 4, wherein the connecting portion for receiving the magnet defines a receiving hole, and the receiving hole communicates with the six polygonal hole.

6. The portable electronic device as claimed in claim 1, further comprising a hinge assembly, wherein the hinge assembly is received in the cavity and includes a main shaft, one end of the main shaft is exposed from the cavity and is received in the other connecting portion.

\* \* \* \* \*